UNITED STATES PATENT OFFICE 2,678,901

FADEPROOF BRILLIANTINE

Arthur Lawrence Fox, Short Hills, and Albin Fritjof Anderson, Allendale, N. J., assignors to Colgate-Palmolive Company, Jersey City, N. J., a corporation of Delaware No Drawing. Application November 13, 1950, Serial No. 195,491

10 Claims. (Cl. 167—87)

This invention relates to a brilliantine and more particularly to a brilliantine containing a dye and a substance that stabilizes the brilliantine against fading due to sunlight.

Brilliantines have been in use for quite some time for the purpose of providing a gloss to the hair. Generally speaking, brilliantines have incorporated therein a suitable dye to impart a tint or full color to the composition such as to render it more attractive to the purchaser. However, brilliantines of this nature have a definite tendency to fade when exposed to sunlight. Apparently the ultraviolet rays from the sun affect the dye in such manner as to destroy its stability. The result is that the briliantine fades when exposed to the sun and consequently becomes of lesser appeal to the purchaser.

It is an object of this invention to provide a brilliantine containing a dye and a compound that greatly inhibits, and in most cases substantially completely prevents, the deleterious effects of sunlight on the dye contained in the brilliantine.

This and other related objects of the invention are accomplished in the following manner.

To a brilliantine, which is generally a mixture of a highly refined mineral oil, a perfume (and sometimes a solvent for the perfume) and a dye, is added benzoyl resorcinol. In certain cases it may be desirable to incorporate in the composition a minor proportion of a vegetable oil, such as almond oil, olive oil, castor oil, peach kernel oil or the like, where a supplemental skin-toning effect is desired. The benzoyl resorcinol appears to function as an ultraviolet absorber to prevent the fading of the color of the brilliantine when the brilliantine is exposed to sunlight prior to use thereof.

A more specific application of this invention is as follows:

A brilliantine of the following formula:

5.00% by weight propylene glycol monolaurate
0.20% benzoyl resorcinol
1.13% perfume
89.67% mineral oil (a refined white oil)
2.00% FD&C Yellow #3 (0.1% solution in mineral oil)
2.00% FD&C Orange #2 (0.1% solution in mineral oil)

---

100.00% was prepared in the following manner:

The benzoyl resorcinol and perfume were dissolved in the propylene glycol monolaurate, and the resulting mixture was then dissolved in the mineral oil whereupon the two dyes were introduced into this mixture and stirred. After 24 hours in the fadeometer the brilliantine remained clear and the color changed only very slightly.

A brilliantine prepared in exactly the same manner, but omitting the benzoyl resorcinol and the propylene glycol monolaurate in which the benzoyl resorcinol was dissolved, exhibited a dark brown precipitate after 24 hours of exposure in the fadeometer, the resulting mixture therefore having lost its sales appeal.

The function of the propylene glycol monolaurate is that of a coupling agent, i. e., a mutual solvent, for the mineral oil and the benzoyl resorcinol. Any other suitable solvent in which the benzoyl resorcinol is soluble and which in turn is soluble in the mineral oil base of the brilliantine may be employed in lieu of, or in conjunction with, the propylene glycol monolaurate. Among such suitable solvents may be mentioned glyceryl triricinoleate, octadecyl alcohol and cyclohexanone.

The nature of the dyes and perfumes employed in the compositions of the present invention is of course not critical, and those skilled in the cosmetics art may select those compounds at will from the wide variety available in the art. The perfume is chosen with a view to masking any undesired odor, if any, of any of the remaining ingredients. In view of the oily base of the brilliantine compositions, preferably the dyes and perfumes are of the oil-soluble type.

The benzoyl resorcinol may be added to the mixture in quantities up to about 1% by weight. The amount of the benzoyl resorcinol used will, of course, depend upon the particular dye color which is added to the brilliantine. As little as 0.1% may be used in some cases, although the amount mentioned in the example above represents generally acceptable practice.

What has been disclosed is a specific embodiment of the invention. Other embodiments obvious to those skilled in the art from the teachings herein are contemplated to be within the spirit and scope of invention as defined in the following claims.

What is claimed is:

1. A brilliantine composition including a major proportion of an oil; a light-sensitive dye to impart a desired color to said composition, and a minor proportion, up to about 1% by weight and sufficient to inhibit the fading of the color imparted to the brilliantine by said dye, of benzoyl resorcinol.

2. A brilliantine composition including a major proportion of a mineral oil, a light-sensitive dye to impart a desired color to said composition, and from about 0.1% to about 1.0% by weight of benzoyl resorcinol to stabilize the dye.

3. A brilliantine composition comprising a major proportion of a mineral oil; a light-sensitive dye to impart a desired color to said composition; a perfume; a minor proportion, up to about 1% by weight and sufficient to inhibit the fading of the color of said brilliantine composition, of benzoyl resorcinol; and a mutual solvent for the mineral oil and the benzoyl resorcinol.

4. A brilliantine composition comprising a solution containing a major proportion of a mineral oil; a light-sensitive dye to impart a desired color to said composition; a perfume; from about 0.1% to 1.0% of benzoyl resorcinol to prevent the fading of the color of said brilliantine composition; and a mutual solvent for the mineral oil and the benzoyl resorcinol.

5. A composition as in claim 4 wherein the mutual solvent is propylene glycol monolaurate.

6. A composition as in claim 4 wherein the mutual solvent is glyceryl triricinoleate.

7. A composition as in claim 4 wherein the mutual solvent is octadecyl alcohol.

8. A composition as in claim 4 wherein the mutual solvent is cyclohexanone.

9. A composition as in claim 4 that also contains a minor proportion of a vegetable oil.

10. A brilliantine composition consisting essentially of the following ingredients by weight:

About 5.00% propylene glycol monolaurate;
About 0.20% benzoyl resorcinol;
About 1.13% perfume;
About 89.67% mineral oil;
About 2.00% FD&C Yellow #3 (0.1% solution in mineral oil); and
About 2.00% FD&C Orange #2 (0.1% solution in mineral oil)

References Cited in the file of this patent

UNITED STATES PATENTS

| Number | Name | Date |
|---|---|---|
| 1,884,431 | Watson | Oct. 25, 1932 |
| 2,568,894 | Mackey | Sept. 25, 1951 |

FOREIGN PATENTS

| Number | Country | Date |
|---|---|---|
| 406,195 | Great Britain | Feb. 22, 1934 |

OTHER REFERENCES

The Pharmaceutical Recipe Book, 3rd ed., p. 349 (1943) Am. Pharm. Ass'n.

Hiefer: Drug and Cosmetic Industry No. 1947, pp. 604–605.